July 24, 1928. Re. 17,050

I. E. DEARSLEY

LIFTING JACK

Original Filed Aug. 14, 1924 2 Sheets-Sheet 1

Inventor.
Irwin E. Dearsley
By Barnett & Truman
Attorneys

July 24, 1928.

Re. 17,050

I. E. DEARSLEY

LIFTING JACK

Original Filed Aug. 14, 1924 2 Sheets-Sheet 2

Inventor,
Irwin E. Dearsley
By Barnett & Truman
Attorneys

Reissued July 24, 1928. Re. 17,050

UNITED STATES PATENT OFFICE.

IRWIN E. DEARSLEY, OF RACINE, WISCONSIN, ASSIGNOR TO WALKER MANUFACTURING COMPANY, OF RACINE, WISCONSIN, A CORPORATION OF WISCONSIN.

LIFTING JACK.

Original No. 1,533,168, dated April 14, 1925, Serial No. 732,041, filed August 14, 1924. Application for reissue filed February 12, 1926. Serial No. 87,981.

This invention relates to the class of devices known as lifting jacks, and more particularly to such a device designed to have an exceptionally long lift in proportion to its size and height when in lowered or collapsed position.

While the uses for such a jack are innumerable, it is especially adapted for advantageous use in the automotive industry with the new oversize or balloon tires. For this use it is desirable to have a jack which is compact and of small vertical height when lowered, in order to be placed under the low axle or other frame part when the tire is collapsed, and capable of a comparatively long lift to elevate the car above its normal driving height in order that the tire may be changed.

The jack is of that type employing a plurality of screws working one within another and each contributing its share to the total lift of the jack. According to this invention the screws are telescoped or nested within one another and within the standard of the jack when in lowered position, and driving connections are provided whereby upon a continuous rotation of the driving means, which may be operated from a distance, the screws are successively and individually elevated one at a time with respect to the members in which they are threaded. According to the embodiment of the invention here shown by way of example, two nested screws are employed, the outer screw being an exteriorly threaded sleeve which meshes within a nut formed in the rotatable driving gear. The inner screw meshes within a nut formed in the upper end of the outer screw sleeve. Means are provided to hold the inner screw against rotation at all times but allow it to move vertically. The outer screw sleeve is first held against rotation, and lifted by the driving nut to its full elevation, carrying the inner screw with it bodily. When the sleeve reaches the upper limit of its travel, it becomes locked with the driving nut and is allowed to rotate, and then acts as a unit with the driving nut to lift the inner screw up through the sleeve.

The object of the invention includes, besides providing a jack operating as briefly noted above and as set forth in more detail hereinafter, providing means for positively controlling the inner screw so that it is extended and retracted, regardless of whether there is a load on the jack; providing automatic latching and guiding means between the nested screws and between the screws and the standard, to positively enforce the successive movement of the screws when the driving means is rotated continuously in either direction; and providing a compact and sightly jack, in which the parts are easily assembled and readily accessible.

Other objects and advantages of the invention will be readily apparent from the following detailed description of one approved form of the apparatus.

Figure 1:
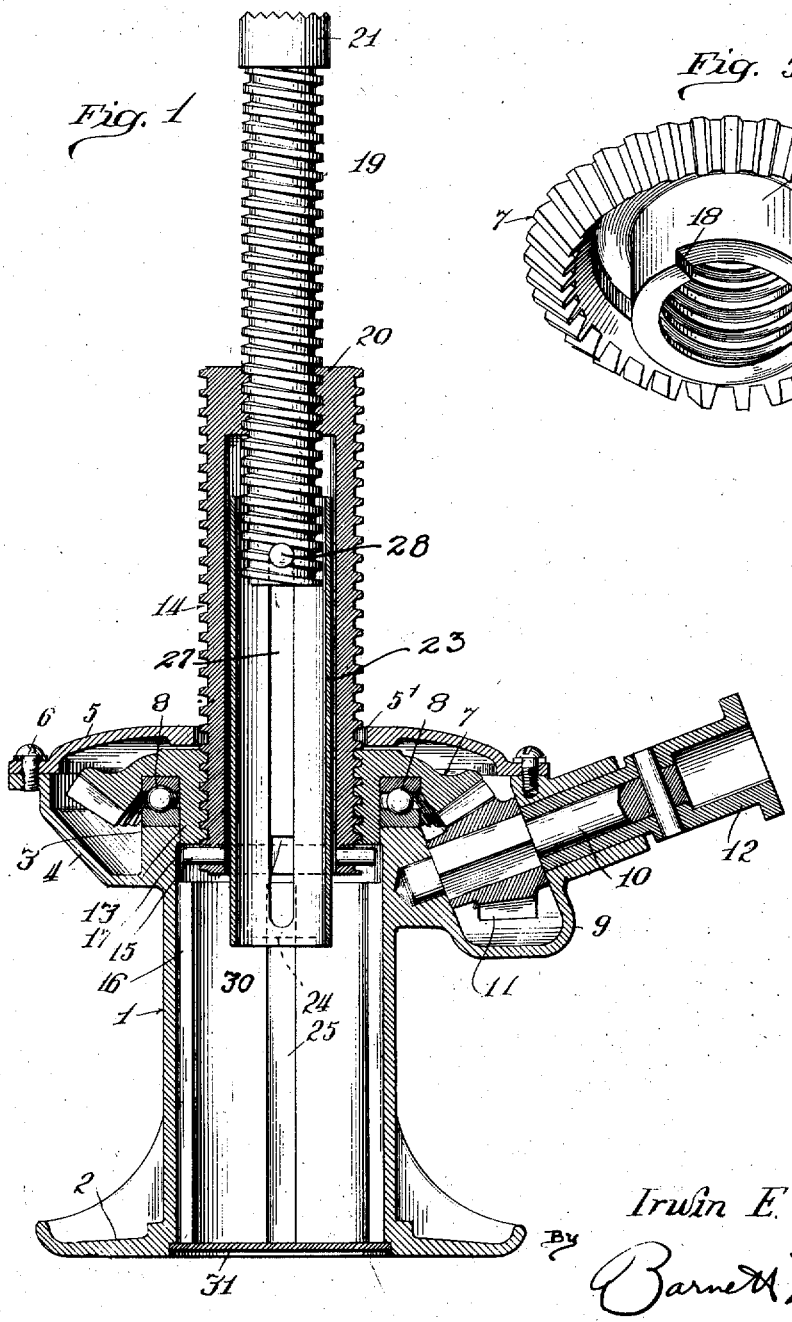
Fig. 1 is a central vertical section through the jack, showing the same in partially elevated position.
Figure 5:
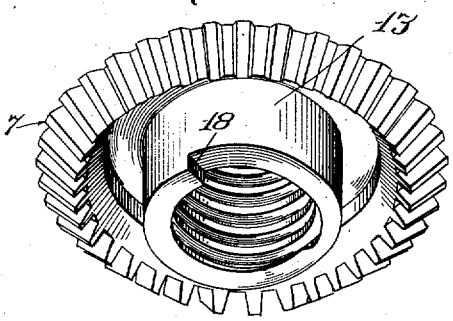
Fig. 5 is a perspective view showing the lower face of the driving gear.

The stationary standard for the jack comprises a substantially cylindrical hollow casting 1, having a broad supporting base 2. At its upper end the standard has an inner annular supporting ring 3, and a flaring housing 4 for enclosing the large driving gear hereinafter described. A cover plate 5, detachably connected with the member 4 by screws 6, completes the housing about the driving mechanism. A central circular opening 5′ in the cover 5 permits the elevation therethrough of the lifting screws hereinafter described.

The rotatable driving member 7, here shown as a comparatively large beveled gear, is supported above the ring 3 of standard 1 by means of an interposed ball bearing assembly 8 or other equivalent form of anti-friction supporting means. Since the driving gear 7 supports the lifting screws, which in turn support the load, the entire load will always be transmitted to the standard 1 through these anti-friction bearings 8 and in this way the lifting or driving strain will be reduced to a minimum. Journaled in a housing extension 9 formed at one side of the standard 1, is a short shaft 10, having keyed thereon, a small beveled pinion 11 meshing with the driving gear 7. The outer end of shaft 10 is provided with a socket member 12, to cooperate with any suitable form of removable handle whereby the jack mav be operated from a distance. It will be noted that the shaft 10 tilts upwardly so that the operator's end of the handle will be elevated to a convenient position.

The beveled driving gear 7 has a central sleeve 13 extending downwardly through the ball bearing assembly 8 and the upper end of supporting ring 3, to act as a guiding and strengthening member, and this sleeve is interiorly threaded to act as a nut for lifting the outer screw. This outer screw is in the form of a hollow sleeve 14, exteriorly threaded to mesh with the nut 13 in the driving gear 7, and is of substantially the same height as the total height of the standard. Short pins or projections 15 extending from opposite sides of the lower end of sleeve 14, travel up and down in vertically extending grooves or slots 16 in the standard 1 to hold the sleeve against rotation during its vertical travel. At their upper ends the slots 16 open into an annular channel 17 formed in the standard 1 directly below the lower end of driving nut 13. The nut 13 is formed on its lower face with a locking shoulder 18 with which one of the pins 15 is adapted to cooperate to lock the sleeve to the nut when the sleeve 14 has reached the upper limit of its travel.

The inner screw 19, which is threaded in the same direction as the outer screw 14, meshes with a nut 20 formed in the upper end of the outer screw sleeve 14. This inner screw is of substantially the same height as the outer screw and the standard, and carries at its upper end a load supporting cap 21 which is mounted thereon by a universally rocking joint so that the cap 21 may adapt itself to the tilting load as the jack is elevated. Movably suspended in the annular space 22 between the inner and outer screws, is a comparatively thin metallic tubular member 23. At its lower end this tube is provided with outwardly extending lugs 24 which travel up and down in slots 25 formed in the standard 1, parallel to and spaced ninety degrees from the slots 16 previously described. Removable spring actuated locking pins 26, projects into the slots 25 near the upper end thereof.

Tube 23 is provided with oppositely disposed vertical slots 27, extending nearly its entire length and in line with the lugs 24. Short pins 28 are slidably mounted in a diametrically disposed opening in the lower end of screw 19, and a compression spring 29 interposed between the inner ends of the two pins 28 normally tends to force them outwardly. These pins 28 slide up and down in the slots 27 in the tube 23. It will be noted that the tube 23 is locked at all times to the stationary standard 1 by means of the lugs 24, and that in turn the inner screw 19 is locked to the tube 23 by means of pins 28 operating in slots 27. By this means, although the screw 19 may be elevated bodily completely out of the standard 1, as shown in Fig. 1, it is at all times locked to the standard in such a manner that it cannot rotate. This tubular locking means for the inner screw is not claimed specifically herein, but is claimed in the patent to Gunnar Jensen, No, 1,538,896, granted May 26, 1925.

At the interior of its lower end, the outer screw sleeve 14 is provided with cammed locking shoulders 30 with which the spring thrust pins 28 are adapted to cooperate to lock the two screws together when the inner screw is completely nested within the outer screw. The cammed or sloping surfaces 30′ leading to the shoulders 30 extend circumferentially inside the lower end of the screw sleeve and are so inclined that the pins 28 will readily ride out away from these shoulders and slide up the inner surface of sleeve 14 when the parts are rotated in such a direction as to elevate the screws, but the pins 28 will lock against shoulders 30 when the parts are so rotated as to lower the inner screw completely within the outer screw.

A plate 31 driven into the lower face of base plate 2 closes the opening in the base of the standard after the parts have been assembled. Although the screw members may be removed through this bottom opening by removing the base plug 31, they may also be taken out through the upper portion of the jack when the cover 5 is removed.

Figure 2:
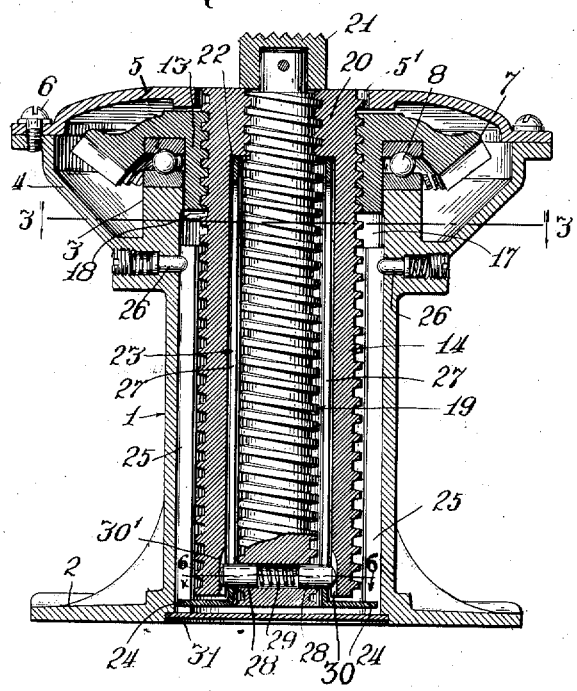
Fig. 2 is a central vertical section, taken at right angles to Fig. 1, showing the jack in lowered position.
Figure 4:
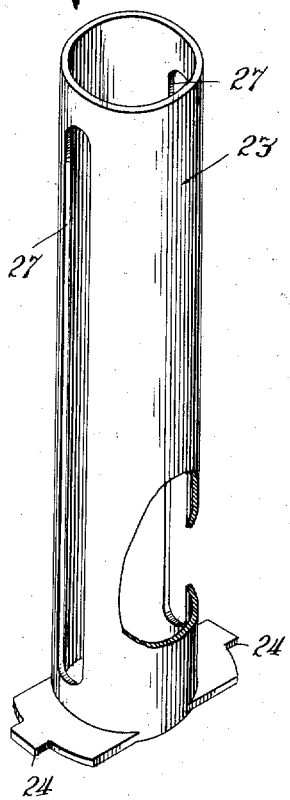
Fig. 4 is a perspective view of the locking sleeve or tube for the inner screw.
Figure 3:
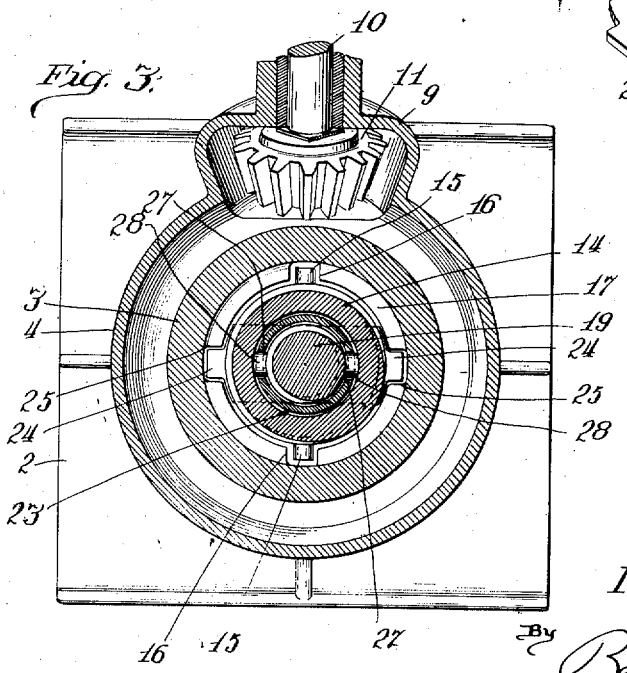
Fig. 3 is a horizontal section taken substantially on line 3—3 of Fig. 2.
Figure 6:
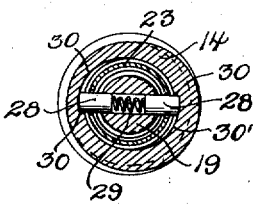
Fig. 6 is a detail sectional plan on line 6—6 of Fig. 2.

In operation, the jack, in collapsed or lowered position as shown in Fig. 2, is inserted beneath the member to be elevated. The removable handle is then inserted in the socket 12, and, with the parts threaded as shown in the drawing, is rotated continuously in a clockwise direction. This will rotate the driving beveled gear 7 in a counter clockwise direction, as viewed from above, and since the outer screw sleeve 14 is held from rotation by the pins 15 projecting into the grooves 16 in standard 1, the rotation of nut 13 in the driving member will elevate the screw sleeve 14 which carries bodily with it the inner screw 19 and the load supported thereby. When the sleeve 14 has reached the upper limit of its travel, the pins 15 will run out of slots 16 into the annular channel 17, allowing them to rotate, and will simultaneously lock against the lower surface of nut 13. The driving gear 7 and sleeve 14 will now rotate as a unit. Since the inner screw 19 is still held against rotation by the tubular member 23 as above described, the rotating nut 20 in the upper end of sleeve 14 will now elevate the inner screw 19 and the load carried thereby, as indicated in Fig. 1. The upward travel of the parts is limited by the engagement of pins 28 with the upper ends of slots 27 and the engagement of the top of tube 23 against the bottom of nut 20. Before reaching the upper limit of their travel lugs 24 will pass the yielding locking pins 26, which then snap out under the lugs. It will be noted that the extreme height of the jack when in extended position is between two and three times its height when in collapsed position.

When the jack is to be lowered the handle is rotated continuously in the opposite direction. The screw sleeve 14 will still be locked to the lower surface of driving member 7 and will rotate therewith, and the inner screw 19 will first be lowered until it is completely nested within the outer screw 14. During this first lowering operation, tube 23 will be held elevated within screw sleeve 14, by the yieldable pins 26 which are now extended below the lower end of the tube. When the inner screw 19 reaches the lower limit of its travel within the outer screw, the pins 28 in the lower end of screw 19 will engage with locking shoulders 30 in the lower end of sleeve 14 and prevent further rotation of this sleeve, the pins 15 being at this time directly over the slots 16. By holding tube 23 elevated until this time, so that pins 28 are at the lower ends of slots 27, adjacent the lugs 24 on the tube, the twisting strain on tube 23 when sleeve 14 is locked, is taken by the stronger lower end of the tube, and the possibility of twisting the tube is avoided. The sleeve 14 will now be screwed down through the continuously rotating driving member 7, the pins 15 on the sleeve sliding down into and through the slots 16 in the standard. Also lugs 24 will be pushed down past spring pins 26 and the tube 23 will slide down to its lowered position.

It will be noted that the load supporting parts of this jack are comparatively simple, and may be made strong and rugged to support a considerable load. The great gear reduction, due to the reducing bevelled gears 11 and 7 and the screws which operate singly, enable one to elevate a great load with little effort, this being further reduced by the anti-friction supporting bearings for the lifting and driving members. The jack, when lowered, is compact and may be stored in a small space, and presents a very sightly appearance, there being no projecting parts except the cap 21 and the socket member 12.

Obviously other forms of rotary driving means than the beveled gears here shown may be used, and the proportions and details of the several parts may be varied without departing from the scope of the invention as set forth in the following claims.

I claim:

1. A lifting jack comprising a hollow standard, a rotatable driving member mounted in the upper portion of the standard, a pair of nested screws mounted in the standard and driving member, and separate connections between the standard and each screw, whereby when the driving member is continuously rotated the outer screw will first be positively elevated to its full height, carrying the inner screw bodily with it, and then the inner screw will be elevated with relation to the outer screw.

2. A lifting jack comprising a hollow standard, a rotatable driving member mounted in the upper portion of the standard, a pair of nested screws mounted in the standard and driving member, and separate connections between the standard and each screw, whereby when the driving member is continuously rotated the outer screw will first be positively elevated to its full height, carrying the inner screw bodily with it, and then the inner screw will be elevated with relation to the outer screw, and connections between the two screws whereby upon reverse rotation of the driving means the inner screw will first be completely nested in the outer screw, and then both screws will be positively lowered into the standard.

3. A lifting jack comprising a standard, a rotatable interiorly threaded driving member mounted in the standard, an exteriorly threaded sleeve meshing within the driving member and having an interiorly threaded nut formed in its upper end, a screw meshing in the nut, means to prevent rotation of the screw but allow it to move vertically, means cooperating with the standard for preventing rotation of the sleeve until it reaches the upper limit of its travel and then locking the sleeve to the driving member to turn therewith, and a yieldable locking member on the lower portion of the screw cooperating with a shoulder in the lower end of the sleeve when the screw and the sleeve are telescoped and the driving member is being rotated to lower the jack.

4. In a lifting jack, the combination of a standard, a driving nut in said standard, a sleeve having an exterior thread meshed with the thread of the nut and an interior thread, an inner screw exteriorly threaded for engagement with the interior thread of the sleeve, cooperating guiding devices on the sleeve and standard which compel the sleeve to move upwardly when the driving nut is rotated forwardly and which are disengaged when the sleeve reaches the upper end of its travel to allow the sleeve to rotate with the nut on continued forward rotation of the latter, to raise the inner screw, and means effective when the driving nut is given reverse rotation, to stop the rotation of the sleeve with its guiding device above and in operative alignment with the guiding device on the standard, so that on further reverse rotation of the driving nut the guiding device on the sleeve moves downward vertically into engagement with the guiding device on the standard.

5. In a lifting jack, the combination of a standard, a driving nut in said standard, a sleeve having an exterior thread meshed with the thread of the nut and an interior thread, an inner screw exteriorly threaded for engagement with the interior thread of the sleeve, a pin on the sleeve, said standard being formed with a vertical guide to receive said pin and with a space above the guide slot in which the pin may move circularly, with continued rotation of the driving nut in the forward direction, and means effective on the reverse rotation of the driving nut for stopping the rotation of the sleeve with the pin directly over said guide slot.

6. In a lifting jack, the combination of a standard, a driving nut in said standard, a sleeve having an exterior thread meshed with the thread of the nut and an interior thread, an inner screw exteriorly threaded for engagement with the interior thread of the sleeve, cooperating guiding and stop means comprising a spring pressed retractable member which means is effective when the nut is rotated in the forward direction to first compel the sleeve to move upwardly and then permit the sleeve to rotate with the nut to raise the inner screw and, when the rotation of the nut is reversed, to stop the rotation of the sleeve with the nut and compel the sleeve to move downwardly.

7. In a lifting jack the combination of a non-rotating supporting structure, a driving nut thereon, a sleeve exteriorly threaded for engagement with said nut, formed with an interior thread and provided with a projecting member, a lifting screw exteriorly threaded for engagement with said sleeve, a vertical guide on said supporting structure against which said projection bears to bring about upward and downward movements of the sleeve and above which the projection is raised when the sleeve is at the upper limit of its travel, and a stop associated with said non-rotating structure which engages said sleeve, when the nut is rotated in the direction to lower said sleeve and arrests rotation of said sleeve at a point to position said projecting member in vertical alignment with said guide.

8. In a lifting jack the combination of a non-rotating supporting structure, a driving nut thereon, a sleeve exteriorly threaded for engagement with said nut, formed with an interior thread and provided with a projecting member, a lifting screw exteriorly threaded for engagement with said sleeve, a vertical guide on said supporting structure against which said projection bears to bring about upward and downward movements of the sleeve and above which the projection is raised when the sleeve is at the upper limit of its travel, and a stop associated with said non-rotating structure comprising a spring pressed retractive member to engage the sleeve and prevent rotation thereof in one direction only, which, when the nut is rotated in the direction to lower the sleeve stops the rotation thereof at a point which positions said projecting member in vertical alignment with said guide on the non-rotating structure.

9. In a lifting jack the combination of a non-rotating supporting structure formed with a vertical guide slot which extends only part way to the top of said structure, a driving nut on said structure, a sleeve exteriorly threaded for engagement with said nut formed with an interior thread, and provided with a projecting member to extend into said guide slot, and a stop associated with said non-rotating structure which engages said sleeve when the nut is rotated in the direction to lower the sleeve and arrests rotation of the sleeve at a point to position said projecting member vertically above the upper end of said guide slot.

10. In a jack, the combination of a non-rotating structure formed with a longitudinal guide, a driving nut, an outer hollow screw meshed with the nut and internally threaded, an inner screw meshed with the internal screw threads of the outer screw and means comprising a spring pressed pin cooperating with said guide, which means when the nut is rotated in one direction forces the outer screw to move without turning to its maximum elevation and then to rotate to elevate the inner screw, and when the driving nut is given a reverse rotation lowers said screws in succession.

11. In a jack, the combination of a non-rotating structure formed with a longitudinal guide, a driving nut, an outer hollow screw meshed with the nut and internally threaded, an inner screw meshed with the internal screw of the outer screw and means comprising a spring pressed pin cooperating with said guide and cams which permit the pin to rotate in one direction but prevent its rotation in the other, which means when the nut is rotated in one direction forces the outer screw to move without turning to its maximum elevation and then to rotate to elevate the inner screw, and when the driving nut is given a reverse rotation lowers said screws in succession.

12. In a lifting jack the combination of a standard, a driving nut revoluble supported thereon, means for rotating said nut, an exteriorly threaded sleeve engaged by said nut and having an interior thread, a lifting screw exteriorly threaded to engage the interior thread of the sleeve, and mechanism made effective, independently of the load on the jack, to give non-rotary movements, outwardly with respect to the standard, first to the sleeve and screw together and then to the screw alone, when the driving nut is rotated in one direction and, when the nut is rotated in the other direction to give non-rotary movements, inwardly with respect to the standard, first to the screw alone and then to the sleeve and screw together.

13. In a lifting jack the combination of a hollow standard, a driving nut revolubly mounted on said standard, an exteriorly threaded sleeve extending through said nut and formed with an internal thread at its upper end, a lifting screw exteriorly threaded to engage the internal thread of the sleeve, a tubular member in said sleeve surrounding said screw, guiding means on the tubular member and standard to prevent rotation while permitting vertical movements of the tubular member, guiding means on the sleeve and standard, preventing rotary movements of the sleeve, except at the uppermost position of the sleeve, while permitting vertical movements of the sleeve, and guiding means on said screw and tubular member which restrains the screw from rotary movement while permitting vertical movements thereof.

14. In a lifting jack the combination of a hollow standard, a driving nut revolubly mounted on said standard, an exteriorly threaded sleeve extending through said nut and formed with an internal thread at its upper end, a lifting screw exteriorly threaded to engage the internal thread of the sleeve, a tubular member in said sleeve surrounding said screw, guiding means on the tubular member and standard to prevent rotation while permitting vertical movements of the tubular member, guiding means on the sleeve and standard, preventing rotary movements of the sleeve, except at the upper-most position of the sleeve, while permitting vertical movements of the sleeve, guiding means on said screw and tubular member which restrains the screw from rotary movement while permitting vertical movements thereof and means at the lower end of said sleeve operative when the screw is in its inner position in the sleeve to stop rotation of the sleeve in one direction while permitting rotation in the other direction.

15. In a lifting jack the combination of a hollow standard, a driving nut revolubly mounted on said standard, an exteriorly threaded sleeve extending through said nut and formed with an internal thread at its upper end, a lifting screw exteriorly threaded to engage the internal thread of the sleeve, a tubular member in said sleeve surrounding said screw and formed with lontiudinal guide slots, guiding means on the tubular member and standard to prevent rotation while permitting vertical movements of the tubular member, guiding means on the sleeve and standard preventing rotary movements of the sleeve, except at the upper-most position of the sleeve, while permitting vertical movements of the sleeve, spring pressed pins in the lower end of the screw to extend through the slots in the tubular member and stop and cam faces on the inner surface of the sleeve at its lower end adapted to be engaged by said pins.

16. In a lifting jack the combination of a hollow standard, a driving nut revolubly mounted on said standard, an externally threaded sleeve extending through said nut and engaging the thread thereof and provided at its upper end with an internal thread, a lifting screw externally threaded to engage the internal thread of the screw, a tubular member in the sleeve surrounding the screw, means on said tubular member and standard for preventing rotation while permitting vertical movements of the tubular member and means preventing rotation while permitting vertical movements of the screw with respect to the tubular member, and limiting rotation of the sleeve in one direction, when the screw is in its inner position in the sleeve, while permitting rotation of the sleeve in the other direction.

17. In a lifting jack the combination of a hollow standard, a driving nut revolubly mounted on said standard, an externally threaded sleeve extending through said nut and engaging the thread thereof and provided at its upper end with an internal thread, a lifting screw externally threaded to engage the internal thread of the screw, a tubular member in the sleeve surrounding the screw formed with a guide slot, a spring pressed pin in the lower end of the screw to extend through said slot and stop and cam faces on the inner surface of the sleeve at its lower end adapted to be engaged by said pin.

18. A lifting jack comprising a standard, an outer screw interiorly and exteriorly threaded, an inner screw in mesh with the interior thread of the outer screw, a driving nut on the standard held from lengthwise movement with respect thereto and engaging the exterior thread of the outer screw, means for rotating the driving nut, means for restraining the inner screw from rotation throughout its range of movement and means cooperating with the outer screw for compelling the screws to be raised or lowered, one after the other, each to the full extent of its vertical movement regardless of the load on the jack.

19. A lifting jack comprising a standard, an outer screw arranged for vertical movement in the standard and having interior and exterior threads of like pitch, an inner screw having a thread in mesh with the interior thread of the outer screw, a driving nut restrained to rotate at a fixed level on the standard and provided with an interior thread in mesh with the exterior thread of the outer screw, and with gear teeth, a gear meshed with said gear teeth on the nut for rotating the nut in either direction and mechanism for controlling the movements of said screws comprising an element vertically movable in the standard having positive sliding and non-rotative connections with the standard and the inner screw.

IRWIN E. DEARSLEY.